(12) United States Patent
Pais et al.

(10) Patent No.: US 10,666,839 B2
(45) Date of Patent: May 26, 2020

(54) CORRECTING FOR OPTICAL DISTORTION IN A LIQUID ENVIRONMENT

(71) Applicant: MOTOROLA MOBILITY LLC, Chicago, IL (US)

(72) Inventors: Martin R. Pais, North Barrington, IL (US); Mark F. Valentine, Kenosho, WI (US)

(73) Assignee: Motorola Mobility LLC, Chicago, IL (US)

( * ) Notice: Subject to any disclaimer, the term of this patent is extended or adjusted under 35 U.S.C. 154(b) by 294 days.

(21) Appl. No.: 15/468,280

(22) Filed: Mar. 24, 2017

(65) Prior Publication Data

US 2018/0278812 A1    Sep. 27, 2018

(51) Int. Cl.
*H04N 5/217*    (2011.01)
*G06T 5/00*    (2006.01)
*H04N 5/232*    (2006.01)

(52) U.S. Cl.
CPC ............ *H04N 5/217* (2013.01); *G06T 5/006* (2013.01); *H04N 5/23222* (2013.01)

(58) Field of Classification Search
CPC ........... H04N 5/217; H04N 5/232; G06T 5/00
See application file for complete search history.

(56) References Cited

U.S. PATENT DOCUMENTS

| 5,826,113 A | * | 10/1998 | Nonaka | ................... | G02B 7/28 |
| | | | | | 396/25 |
| 2011/0058085 A1 | * | 3/2011 | Ito | ......................... | G03B 13/00 |
| | | | | | 348/333.02 |
| 2016/0146935 A1 | * | 5/2016 | Lee | ......................... | G01S 15/02 |
| | | | | | 367/87 |
| 2018/0151151 A1 | * | 5/2018 | Chang | .................... | G09G 5/006 |

* cited by examiner

*Primary Examiner* — Dave Czekaj
*Assistant Examiner* — Berteau Joisil
(74) *Attorney, Agent, or Firm* — Yudell Isidore PLLC

(57) ABSTRACT

A method, system, and computer program product to correct for optical distortion in media captured by a camera in a liquid environment. The method includes detecting immersion of an image capturing device in a liquid environment. The method further includes determining a most recent location of the image capturing device and accessing a geographical database to determine a specific liquid environment that is associated with the most recent location. The method further includes automatically retrieving a corrected camera refractive index corresponding to the specific liquid environment. The method further includes intercepting live image data of a current scene that is captured by at least one camera sensor of the image capturing device and applying the corrected camera refractive index to the live image data to correct for an optical distortion in the live image data. The method further includes providing the corrected live image data to an output device.

20 Claims, 7 Drawing Sheets

CORRECTING FOR OPTICAL DISTORTION IN A LIQUID ENVIRONMENT

BACKGROUND

1. Technical Field

The present disclosure generally relates to electronic devices for capturing media and in particular to a method for correcting for optical distortion in captured media.

2. Description of the Related Art

Modern image capturing devices, such as cameras associated with cellular phones, can be used to capture media, such as still images and/or video. While these devices are typically manufactured to capture media in air, many image capturing devices may be water-proof or water-resistant and may be used to capture images and/or video while immersed in a liquid environment, such as under water in a swimming pool. However, when immersed in a liquid environment, the superposition of the liquid at the camera introduces a change in a refractive index. This change in refractive index causes media captured by the cameras to be distorted, which, in many situations, is unacceptable to a user of the image capturing device. Current solutions include attaching a water-proof external hard case that envelopes the image capturing device in air. This maintains an in-air optical path of a lens of the camera, which mitigates distortion caused by the liquid environment. However, a water-proof external hard case introduces some distortion of its own since the camera must then capture media through the transparent hard case. This may result in a degraded image/video that is undesirable to a user. Additionally, the water-proof external hard case requires that a user either carry around additional equipment to capture images underwater and/or leave the hard case permanently attached to the image capturing device, which increases a thickness of the image capturing device. Thus, the inconvenience of the hard case may also be undesirable to a user.

BRIEF DESCRIPTION OF THE DRAWINGS

The description of the illustrative embodiments is to be read in conjunction with the accompanying drawings. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
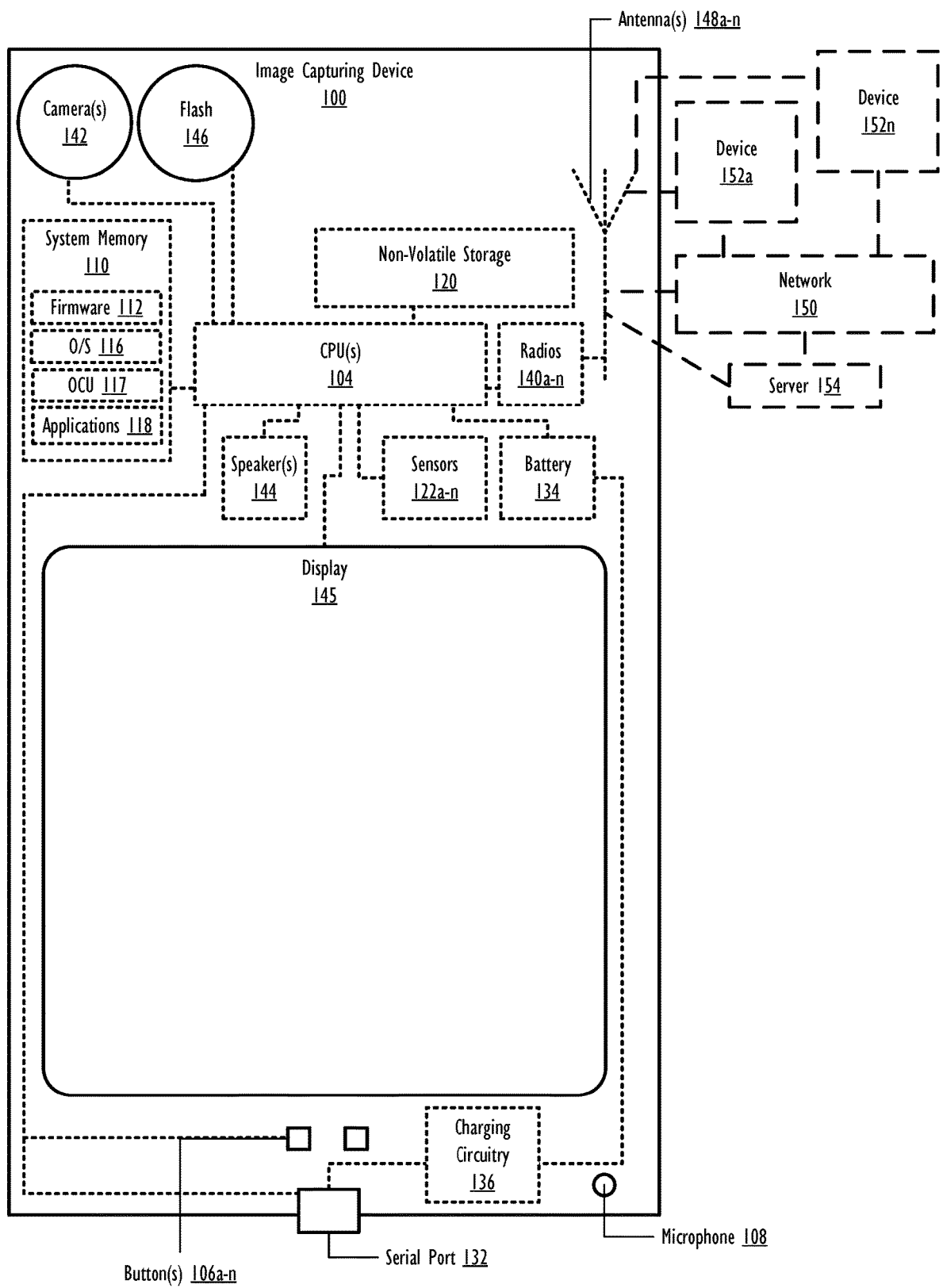
FIG. 1 illustrates an image capturing device within which certain aspects of the disclosure can be practiced, in accordance with one or more embodiments.

The illustrative embodiments provide a method, a system, and a computer program product for correcting for optical distortion in media captured by a camera in a liquid environment. The method includes detecting immersion of an image capturing device in a liquid environment. The method further includes, in response to detecting the immersion of the image capturing device: retrieving a location data associated with the image capturing device; and determining, from the location data, a most recent location of the image capturing device. The method further includes accessing a geographical database to determine a specific liquid environment that is associated with the most recent location, and automatically retrieving, from a correction database, a corrected camera refractive index corresponding to the specific liquid environment. The method further includes intercepting live image data of a current scene that is captured by at least one camera sensor of the image capturing device. The method further includes applying the corrected camera refractive index to the live image data to correct for an optical distortion in the live image data caused by the specific liquid environment, and providing the corrected live image data in real time to an output device.

The above contains simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the following figures and the remaining detailed written description. The above as well as additional objectives, features, and advantages of the present disclosure will become apparent in the following detailed description.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

As utilized herein, a liquid environment refers to any liquid body, such as a salt water ocean or fresh water in a swimming pool. A liquid environment may be any size and may be located indoors or outdoors.

As utilized herein, a live image data refers to image data that is captured by a camera/camera sensor in real time. Non-limiting examples of live image data include: a video stream, at least one still frame, and/or a burst image.

Those of ordinary skill in the art will appreciate that the hardware components and basic configuration depicted in the following figures may vary. For example, the illustrative components within image capturing device 100 are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

Now turning to FIG. 1, there is illustrated an example image capturing device 100 within which one or more of the described features of the various embodiments of the disclosure can be implemented. In one embodiment, image capturing device 100 can be any electronic device that is equipped with at least one camera. Example image capturing devices can include, but are not limited to, a notebook computer, a mobile phone, a digital camera, a video recorder, or a tablet computer. Image capturing device 100 includes at least one processor or central processing unit (CPU) 104. CPU(s) 104 is coupled to non-volatile storage 120 and system memory 110, within which firmware 112, operating system (OS) 116, optical correction utility (OCU) 117, and applications 118 can be stored for execution by CPU(s) 104. According to one aspect, OCU 117 executes within image capturing device 100 to perform the various methods and functions described herein. In one or more embodiments, OCU 117 corrects for optical distortion in live image data captured by a camera immersed in a liquid environment. For simplicity, OCU 117 is illustrated and described as a stand-alone or separate software/firmware/logic component, which provides the specific functions and methods described below. However, in at least one embodiment, OCU 117 may be a component of, may be combined with, or may be incorporated within firmware 112, or OS 116, and/or within one or more of applications 118.

As shown, image capturing device 100 may include input devices and output devices that enable a user to interface with image capturing device 100. In the illustrated embodiment, image capturing device 100 includes camera 142, camera flash 146, display 145, hardware buttons 106a-n, microphone(s) 108, and speaker(s) 144. While only one camera (camera 142) and one flash (flash 146) is illustrated, image capturing device 100 may include additional cameras and/or flashes, in other embodiments. Hardware buttons 106a-n are selectable buttons which are used to receive manual/tactile input from a user to control specific operations of image capturing device 100 and/or of applications executing thereon. In one embodiment, hardware buttons 106a-n may also include or may be connected to one or more sensors (e.g. a fingerprint scanner) and/or may be pressure sensitive. Hardware buttons 106a-n may also be directly associated with one or more functions of a graphical user interface (not pictured) and/or functions of an OS, application, or hardware of image capturing device 100. In one embodiment, hardware buttons 106a-n may include a keyboard. Microphone(s) 108 may be used to receive spoken input/commands from a user. Speaker(s) 144 is used to output audio.

CPU(s) 104 is also coupled to sensors 122a-n and display 145. Sensors 122a-n can include, but are not limited to, at least one of: infrared (IR) sensors, thermal sensors, light sensors, proximity sensors, immersion/liquid-detection sensors, depth sensors, altimeters, temperature, and camera/image sensors. Display 145 is capable of displaying text, media content, and/or a graphical user interface (GUI) associated with/generated by firmware and/or one or more applications executing on image capturing device 100. The GUI can be rendered by CPU(s) 104 for viewing on display 145, in one embodiment, or can be rendered by a graphics processing unit (GPU), in another embodiment. In one embodiment, display 145 is a touch screen that is also capable of receiving touch/tactile input from a user of image capturing device 100, when the user is interfacing with a displayed GUI. In at least one embodiment, image capturing device 100 can include a plurality of virtual buttons or affordances that operate in addition to, or in lieu of, hardware buttons 106*a-n*. For example, image capturing device 100 can be equipped with a touch screen interface and provide, via a GUI, a virtual keyboard or other virtual icons for user interfacing therewith.

Image capturing device 100 also includes serial port 132 (e.g., a universal serial bus (USB) port), battery 134, and charging circuitry 136. Serial port 132 can operate as a charging port that receives power via an external charging device (not pictured) for charging battery 134 via charging circuitry 136. Battery 134 may include a single battery or multiple batteries for providing power to components of image capturing device 100. Serial port 132 may also function as one of an input port, an output port, and a combination input/output port. In one embodiment, battery 134 includes at least one battery that is removable and/or replaceable by an end user. In another embodiment, battery 134 includes at least one battery that is permanently secured within/to image capturing device 100.

Image capturing device 100 may also include one or more wireless radios 140*a-n* and can include one or more antenna(s) 148*a-n* that enable image capturing device 100 to wirelessly connect to, and transmit and receive voice and/or data communication to/from, one or more other devices, such as devices 152*a-n* and server 154. As a wireless device, image capturing device 100 can transmit data over a wireless network 150 (e.g., a Wi-Fi network, cellular network, Bluetooth® network (including Bluetooth® low energy (BLE) networks), a wireless ad hoc network (WANET), or personal area network (PAN)). In one embodiment, image capturing device 100 is further equipped with infrared (IR) device (not pictured) for communicating with other devices using an IR connection. In another embodiment, wireless radios 140*a-n* includes a short-range wireless device, including, but not limited to, a near field communication (NFC) device. In still another embodiment, image capturing device 100 communicates with one or more other device(s) using a wired or wireless USB connection.

Figure 2:
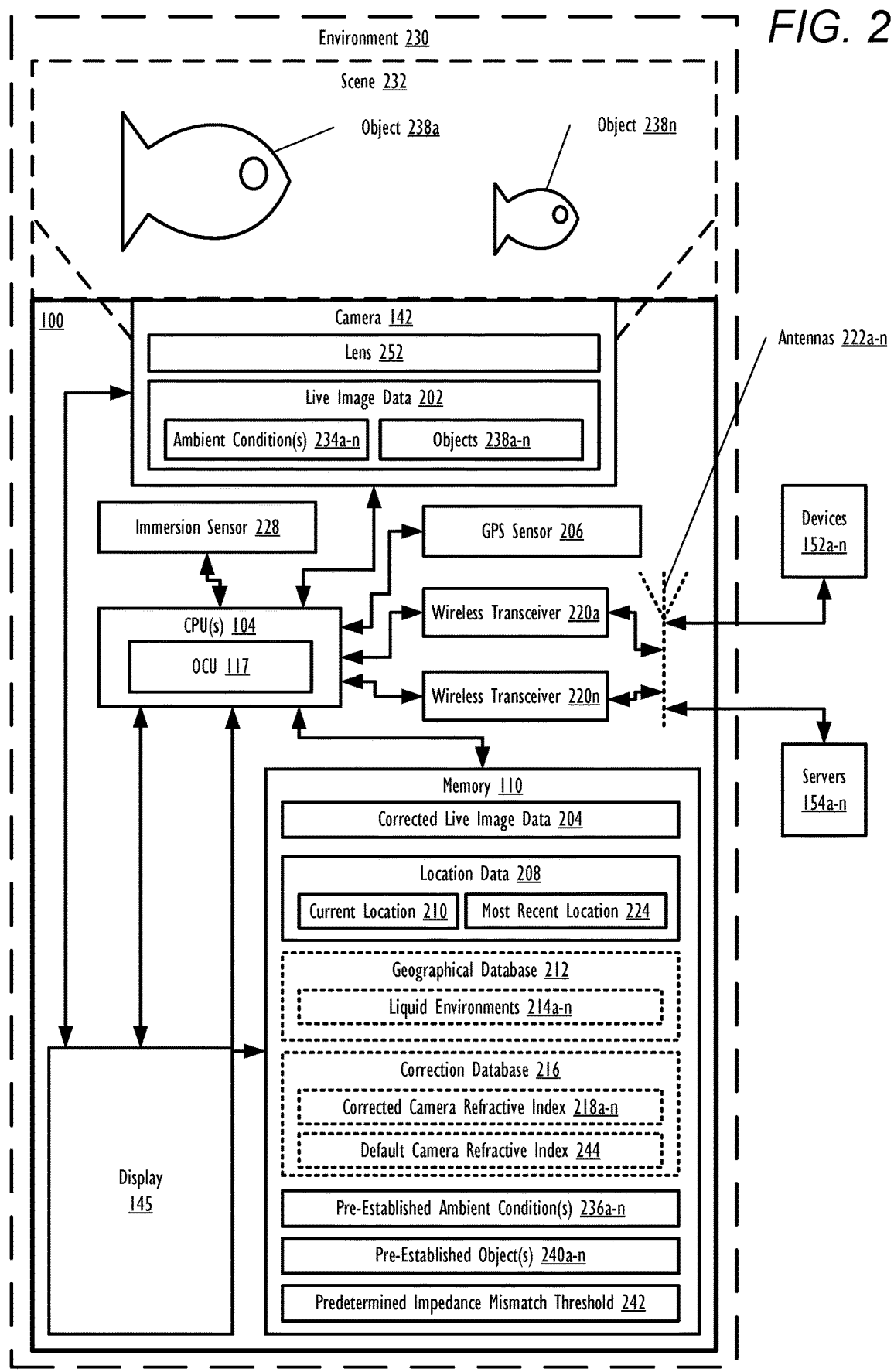
FIG. 2 illustrates an image capturing device that is configured to correct for optical distortion in media captured by a camera in a liquid environment, in accordance with one or more embodiments.

FIG. 2 is a block diagram illustrating additional functional components within example image capturing device 100, which is configured to correct for optical distortion in media captured by a camera in a liquid environment, in accordance with one or more embodiments of the present disclosure. In the embodiments described herein, image capturing device 100 is resistant to the ingress of liquids, such as water. In one or more embodiments, image capturing device 100 is also resistant to the ingress of dust, dirt, and/or sand. In another embodiment, image capturing device 100 is water-proof and/or dust-proof. As illustrated, image capturing device 100 includes CPU(s) 104, memory 110, camera 142 and display 145. In one or more embodiments, camera 142 includes lens 252 for capturing images and/or video in scene 232. CPU(s) 104 executes OCU 117 which monitors input received from at least one input device and/or at least one sensor to determine whether a current environment (e.g., environment 230) of image capturing device 100 is a liquid environment. On response to determining image capturing device 100 is immersed in a liquid environment, OCU 117 determines a specific liquid environment in which image capturing device 100 is immersed. In response to determining the specific liquid environment, CPU(s) 104 retrieves a corrected camera refractive index 218*a-n* that is associated with the specific liquid environment. When applied to live image data 202, corrected camera refractive indexes 218*a-n* correct for optical distortions caused by the specific liquid environment. Corrected live image data (corrected live image data 204) may be provided to at least one output device (e.g., display 145). In one or more embodiments, image capturing device includes global positioning satellite (GPS) sensor 206, wireless transceivers 220*a-n* (which may be communicatively connected to devices 152*a-n* and/or servers 154*a-n*), and/or immersion sensor 228.

In one or more embodiments, in response to receiving an input, as described below, that indicates image capturing device 100 is immersed in a liquid environment, CPU(s) 104 performs at least one verification to validate image capturing device 100 as being immersed in a liquid environment. The verification is performed to confirm or deny whether image capturing device 100 is immersed in a liquid environment. The verification may identify circumstances where a determination that image capturing device 100 is immersed in a liquid environment was made in error and further serves to prevent the application of a corrected camera refractive index 218*a-n* when image capturing device 100 is not actually immersed in a liquid environment. In one embodiment, the verification is performed using any different one of the various immersion detection methods described below. For example, if a first input indicating the image capturing device 100 is immersed in a liquid environment is received as a result of detecting RF impedance mismatch, CPU(s) performs the verification via a second detection method (e.g., reading immersion sensor 228 to determine whether image capturing device 100 is immersed in a liquid environment). In another embodiment, each immersion detection method described herein may only be verified by at least one other specific immersion detection method(s) from among the various immersion detection methods described below. For example, in response to a current location indicating image capturing device 100 is immersed in a liquid environment, CPU(s) 104 performs a verification of whether image capturing device 100 is immersed in a liquid environment by either (1) determining, via immersion sensor 228, whether environment 230 is a liquid environment or (2) determining whether an RF impedance mismatch at antenna(s) 222*a-n* indicates environment 230 is a liquid environment. In response to the verification confirming that image capturing device 100 is immersed in the liquid, CPU(s) 104 identifies image capturing device 100 as being immersed in a liquid environment. In one or more embodiments, CPU(s) 104 omits the verification in response to receiving a manual input from a user that indicates image capturing device 100 is, or is not, immersed in a liquid environment. Thus, a user may manually enable/disable correction of live image data 202 at any time.

In one embodiment, image capturing device 100 includes immersion sensor 228. Immersion sensor 228 monitors surrounding environment 230 (i.e., the environment immediately surrounding the image capturing device 100 when the image capturing device 100 is operating) and continually provides environmental input to CPU(s) 104 which indicates whether environment 230 is a gaseous environment (e.g., air) or a liquid environment (e.g., water). In one embodiment, the environmental input includes an indication of a specific type of gaseous environment or liquid environment, such as air, salt water, or fresh water, or other liquid. CPU(s) 104 may select a specific corrected camera refractive index 218*a-n* based on the specific environment that is detected, as described in greater detail below. In another embodiment, the environmental input may provide only a binary determination of whether environment 230 is a gaseous environment or a liquid environment. In response to receiving an input from immersion sensor 228 (which is proximate to camera 142) that indicates the presence of a liquid environment, OCU 117 may identify image capturing device 100 as being immersed in a liquid environment. Alternatively, in response to immersion sensor 228 detecting a liquid environment, CPU(s) 104 performs at least one verification, using at least one different method from among the immersion detection methods described herein, to confirm image capturing device 100 as being immersed in a liquid environment. The at least one verification is performed prior to identifying image capturing device 100 as being immersed in a liquid environment.

For example, a drop of water on immersion sensor 228 may cause immersion sensor 228 to provide an input to CPU(s) 104 that indicates the presence of fresh water liquid environment. In response to receiving this input, CPU(s) 104 may perform a verification by reading an RF impedance mismatch value at antenna(s) 222, as described in greater detail below. In response to the verification confirming that image capturing device 100 is immersed in a liquid environment, CPU(s) 104 identifies image capturing device 100 as being immersed in a liquid environment.

In another embodiment, image capturing device 100 includes GPS sensor 206, which detects current location 210 of image capturing device 100. GPS sensor 206 may optionally record current location 210 within location data 208 of memory 110. GPS sensor may continually monitor current location 210 during operation of image capturing device 100. Alternatively, GPS sensor 206 may periodically (e.g., every 1-5 minutes) detect current location 210 of image capturing device 100. It should also be noted that, in an alternate embodiment, CPU(s) 104 may determine current location 210 by triangulating a wireless network signal to a wireless carrier via at least one of wireless transceivers 220a-n. Current location 210 may be compared to location data in geographical database 212 to determine whether image capturing device 100 is immersed a liquid environment. Geographical database 212 includes map and location data that identifies liquid environments 214a-n. As presented herein, liquid environments 214a-n are geographical regions and may include, but are not limited to, ponds, swimming pools, rivers, lakes, reservoirs, and/or oceans. In one embodiment, geographical database 212 may further identify a specific type of liquid (e.g., fresh water or salt-water) for each of liquid environments 214a-n. In one embodiment, geographical database 212 is stored within memory 110. In another embodiment, geographical database 212 is partially or entirely stored on a remote device (e.g., devices 152a-n and/or servers 154a-n) that is remotely accessible to image capturing device 100. For example, image capturing device 100 may remotely access, via wireless transceiver 220a, geographical database 212 at server 154a over an internet or other connection. In response to detecting current location 210, CPU(s) 104 accesses geographical database 212 to determine whether current location 210 is within at least one of liquid environments 214a-n. In response to determining current location 210 is within at least one of liquid environments 214a-n, CPU(s) 104 performs at least one verification, using at least one different method from among the immersion detection methods described herein, to confirm image capturing device 100 as being immersed in a liquid environment. The at least one verification is performed prior to identifying image capturing device 100 as being immersed in a liquid environment. In response to the verification confirming that image capturing device 100 is immersed in a liquid environment, CPU(s) 104 identifies image capturing device 100 as being immersed in a liquid environment.

In still another example of when verification is required to avoid incorrectly adjusting captured images, image capturing device 100 is located on a boat in the middle of the Atlantic Ocean. In this example, GPS sensor 206 reads current location 210 and CPU(s) 104 determines that current location 210 is located within a region of the Atlantic Ocean, which is a liquid environment. CPU(s) 104 then performs a verification via another of the immersion detection methods described herein to verify whether image capturing device 100 is immersed in a liquid environment. For example, CPU(s) 104 determines whether an impedance mismatch condition is present at antenna(s) 222a-n and/or reads a value at immersion sensor 228 to determine whether a liquid environment is detected. In response to determining an impedance mismatch condition is not present at antenna(s) 222a-n and/or immersion sensor 228 not detecting a liquid environment CPU(s) 104 determines image capturing device 100 is not immersed in a liquid environment. Thus, a corrected camera refractive index 218a-n is not retrieved and/or applied to live image data 202.

In another embodiment, image capturing device 100 may also utilize antenna(s) 222a-n to determine whether image capturing device 100 is immersed in a liquid environment. CPU(s) 104 may measure a radio-frequency (RF) impedance at antenna(s) 222a-n and determine whether the impedance matches a source impedance (e.g., a source impedance provided by an output device, such as wireless transceiver 222a of image capturing device 100). In response to detecting a RF impedance mismatch at antennas 222a-n, CPU(s) 104 compares the detected level of RF impedance mismatch at antennas 222a-n to a predetermined impedance mismatch threshold 242. In another embodiment, the absolute value of the RF impedance mismatch at antennas 222a-n is used by CPU(s) 104 to determine whether image capturing device 100 is immersed in a liquid environment. It should also be noted that the value of the RF impedance mismatch may be used to determine the specific type of liquid environment in which image capturing device 100 is immersed and/or an approximate depth of image capturing device 100 in the specific liquid environment. The approximate depth may also be used to determine an approximate temperature of the specific liquid environment at the approximate depth. In response to determining the detected level of the RF impedance mismatch exceeds predetermined impedance mismatch threshold 242, CPU(s) 104 identifies image capturing device 100 as being immersed in a liquid environment. Alternatively, in response to the detected level of the RF impedance mismatch indicating image capturing device 100 is likely to be immersed within at least one of liquid environments 214a-n, CPU(s) 104 performs at least one verification, using at least one different method from among the immersion detection methods described herein, to confirm image capturing device 100 as being immersed in a liquid environment. The at least one verification is performed prior to identifying image capturing device 100 as being immersed in a liquid environment. In response to the verification confirming that image capturing device 100 is immersed in a liquid environment, CPU(s) 104 identifies image capturing device 100 as being immersed in a liquid environment.

In another embodiment, image capturing device 100 may analyze contents of live image data 202 to determine whether image capturing device 100 is immersed in a liquid environment. CPU(s) 104 analyzes live image data 202 in real time to identify ambient conditions 234a-n. Ambient conditions 234a-n identify specific ambient light colors, ambient light color ranges, and/or light source conditions in current scene 232. Ambient conditions 234a-n may then be compared to pre-established ambient conditions 236a-n to determine whether image capturing device 100 is immersed in a liquid environment. Pre-established ambient conditions 236a-n establish specific ambient light colors, ambient light color ranges, and/or light source conditions that, if present in live image data 202, indicate that image capturing device 100 is immersed in a liquid environment. Pre-established ambient conditions 236a-n may be stored in memory 110, as illustrated in FIG. 2. Alternatively, pre-established ambient conditions 236a-n may be stored on a device (e.g., devices 152a-n and/or servers 154a-n) that is remotely accessible to image capturing device 100. For example, pre-established ambient conditions 236a may identify a particular hue (or range of hues) of light green that is associated with a river liquid environment. CPU(s) 104 analyzes live image data 202 and identifies a particular hue of green (ambient condition 234a) that is pervasive in current scene 232. In response to detecting ambient condition 234a, CPU(s) 104 compares the detected ambient condition 234a to pre-established ambient conditions 236a-n. In response to determining ambient conditions 234a corresponds to at least one of pre-established ambient condition (e.g., pre-established ambient condition 236a), CPU(s) 104 identifies image capturing device 100 as being immersed in a liquid environment. Alternatively, in response determining the detected ambient conditions 234a-n are associated with at least one of pre-established ambient conditions 236a-n, CPU(s) 104 performs at least one verification, using at least one different method from among the immersion detection methods described herein, to confirm image capturing device 100 as being immersed in a liquid environment. The at least one verification is performed prior to identifying image capturing device 100 as being immersed in a liquid environment. In response to the verification confirming that image capturing device 100 is immersed in a liquid environment, CPU(s) 104 identifies image capturing device 100 as being immersed in a liquid environment.

In another embodiment, CPU(s) 104 identifies, in real-time, objects 238a-n in current scene 232 and determines, based on the identified objects 238a-n, whether image capturing device 100 is immersed in a liquid environment. Objects 238a-n may include animate objects, such as a human or a starfish, or inanimate objects, such as rock or sand. CPU(s) 104 compares the detected objects 238a-n to pre-established objects 240a-n. Pre-established objects 240a-n are objects that, if present in live image data 202, indicate that image capturing device 100 is immersed in a liquid environment. For example, pre-established objects 240a-n may identify specific creatures (e.g. a clownfish or seaweed) or inanimate object (e.g., pool drain) as being associated with a liquid environment. Pre-established objects 240a-n may be stored in memory 110, as illustrated in FIG. 2. Alternatively, pre-established objects 240a-n may be stored on a remote device (e.g., devices 152a-n and/or servers 154a-n) that is remotely accessible to image capturing device 100. In response to determining at least one of objects 238a-n corresponds to at least one of pre-established objects 240a-n, CPU(s) 104 identifies image capturing device 100 as being immersed in a liquid environment. Alternatively, in response determining the detected objects 238a-n are associated with at least one of pre-established objects 240a-n, CPU(s) 104 performs at least one verification, using at least one different method from among the immersion detection methods described herein, to confirm image capturing device 100 as being immersed in a liquid environment. The at least one verification is performed prior to identifying image capturing device 100 as being immersed in a liquid environment.

In another example, while taking pictures of fish in an aquarium, image capturing device 100 may detect the presence of a particular object (e.g., a starfish) and/or ambient condition (e.g., a specific blue ambient color) that is associated with a liquid environment. In response to identifying the particular object and/or ambient color, CPU(s) 104 then performs a verification via another of immersion detection methods described herein to verify whether image capturing device 100 is immersed in a liquid environment. For example, CPU(s) 104 may perform a verification which includes performing an environmental reading, via immersion sensor 228 to determine whether image capturing device 100 is immersed in a liquid environment. In response to immersion sensor 228 indicating image capturing device 100 is immersed in a liquid environment, CPU(s) 104 identifies image capturing device 100 as being immersed in a liquid environment. If a reading by immersion sensor 228 indicates image capturing device 100 is not immersed in a liquid environment, image capturing device 100 is not identified as being immersed in a liquid environment.

In another embodiment, image capturing device 100 monitors, in real-time, objects 238a-n in live image data 202 for distortions that indicate image capturing device 100 is immersed in a liquid environment. For example, CPU(s) 104 may identify, within live image data 202, a particular object (e.g., a quarter) that appears to be distorted in a manner that is inconsistent with a known shape of that object. In response to determining at least one of objects 238a-n is distorted, CPU(s) 104 identifies image capturing device 100 as being immersed in a liquid environment. Alternatively, in response to determining the detected objects 238a-n include distortions, CPU(s) 104 performs at least one verification, using at least one different method from among the immersion detection methods described herein, to confirm image capturing device 100 as being immersed in a liquid environment. The at least one verification is performed prior to identifying image capturing device 100 as being immersed in a liquid environment. In response to the verification confirming that image capturing device 100 is immersed in a liquid environment, CPU(s) 104 identifies image capturing device 100 as being immersed in a liquid environment.

In another embodiment, CPU(s) 104 may receive, via an input device (e.g., a touchscreen display), manual input from a user that indicates image capturing device 100 is immersed in a liquid environment. Similarly, CPU(s) 104 may also receive manual input from a user that indicates image capturing device 100 is not immersed in a liquid environment. As an example implementation, this functionality can be incorporated into one or more of the selectable mode settings on the device associated with the operation of image capturing device 100.

In response to determining image capturing device 100 is immersed in a liquid environment, as described in the various embodiments above, CPU(s) 104 determines a specific liquid environment (e.g., liquid environment 214a) in which the image capturing device is immersed. In one embodiment, CPU(s) 104 determines the specific liquid environment based on an input received from immersion sensor 228 or a RF impedance mismatch detected at antenna(s) 222a-n. In another embodiment, CPU(s) 104 determines the specific liquid environment by correlating a most recent location (most recent location 224) of image capturing device 100 to a liquid environment identified in geographical database 212. In this embodiment, CPU(s) 104 reads location data 208 and determines most recent location 224 of image capturing device 100. In one embodiment, most recent location 224 may be current location 210. In another embodiment, most recent location 224 is a last recorded location (e.g., a last recorded location by GPS sensor 206). For example, image capturing device 100 may be unable to detect current location 210 via GPS sensor 206 due to GPS sensor 206 not functioning properly while being immersed in a liquid environment. Image capturing device 100 instead identifies, within location data 208, most recent location 224, which is a most recently recorded location of GPS sensor 206. In response to determining most recent location 224, CPU(s) 104 accesses geographical database 212 to determine a specific liquid environment (e.g., liquid environment 214a) that is associated with most recent location 224. In response to identifying the specific liquid environment 214a corresponding to most recent location 224, CPU(s) 104 automatically retrieves, from among a plurality of corrected camera refractive indexes 218a-n stored in correction database 216, a specific corrected camera refractive index (e.g., corrected camera refractive indexes 218a) that corresponds to specific liquid environment 214a. Corrected camera refractive indexes 218a-n provide a configuration that when applied to live image data 202, correct for an optical distortion caused by the specific liquid environment. The corrected camera refractive index 218a-n includes corrections that adjust the appearance of live image data 202 to account for the superposition of the specific liquid environment relative to an environment for which camera 142 is calibrated (e.g., an air environment). Corrected camera refractive indexes 218a-n may also adjust for a depth of the camera and/or a color, particle content, depth, composition, and/or temperature of a specific liquid environment 214a-n. Each corrected camera refractive index 218 is associated with a specific liquid environment 214a-n and/or a specific composition of the liquid within that specific liquid environment 214a-n. Each corrected camera refractive index 218 may be further associated with a particular camera (e.g., camera 142) and/or a particular depth in a specific type of liquid environment. Correction database 216 may be stored within memory 110 or may be stored on a device (e.g., devices 152a-n and/or servers 154a-n) that is remotely accessible to image capturing device 100.

In response to retrieving the corrected camera refractive index (e.g., corrected camera refractive index 218a) corresponding to specific liquid environment 214a, CPU(s) 104 intercepts live image data 202 captured by camera 142. CPU(s) 104 applies corrected camera refractive index 218a to live image data 202 to create corrected live image data 204, which corrects for an optical distortion caused by the specific liquid environment 214a. Corrected live image data 204 is then provided, in real time, to at least one output device (e.g., display 145). Corrected live image data 204 may also be recorded to memory 110. Corrected live image data 204 may also be provided to another device that is communicatively coupled to image capturing device 100. For example, image capturing device 100 may be wirelessly tethered to device 152a. Corrected live image data 204 may be provided, in real-time, to device 152a via the wireless connection.

In one or more alternate or ancillary embodiments, a user may specify a specific corrected camera refractive index 218 to apply to live image data 202. For example, each of the one or more selectable mode settings may be associated with a specific liquid environment and a corresponding corrected camera refractive index 218a-n. A user may select one of the one or more of the selectable mode settings on the device based on a current liquid environment they are immersed in (or proximate to). In response to receiving the selection, CPU(s) 104 automatically applies the corresponding corrected camera refractive index 218a-n to live image data 202 to create corrected live image data 204.

In one or more embodiments, after applying corrected camera refractive index 218a to live image data 202, CPU(s) 104 may receive, via at least one input device, an input that indicates image capturing device 100 is no longer immersed in a liquid environment. For example, CPU(s) 104 may receive an input from immersion sensor 228 that indicates image capturing device 100 is no longer immersed in a liquid environment. In another example, CPU(s) 104 may receive an input that indicates that there is no longer an impedance mismatch condition at antennas 222a-n. In another example, CPU(s) 104 may determine that a particular object 238a-n and/or ambient condition 234a-n associated with a liquid environment that was previously identified in live image data 202 has not been visible for a predetermined amount of time. In another example, CPU(s) 104 may receive an input from GPS sensor 206 that indicates image capturing device is no longer in a region associated with a liquid environment. In still another example, CPU(s) 104 may receive an input that indicates distortions have not been detected in corrected live image data 204 for a predetermined amount of time.

In response to receiving an input that indicates image capturing device 100 is no longer immersed in a liquid environment, CPU(s) 104 retrieves, from correction database 216, default camera refractive index 244, and CPU 104 applies default camera refractive index 244 to the live image data 202. Default camera refractive index 244 is configured for capturing live image data in a non-liquid environment (e.g., air). In one or more embodiments, CPU(s) 104 may perform at least one verification that image capturing device 100 is no longer immersed in a liquid environment and CPU(s) 104 may only apply default camera refractive index 244 to the live image data 202 after validating that image capturing device 100 is no longer immersed in a liquid environment.

Figure 3:
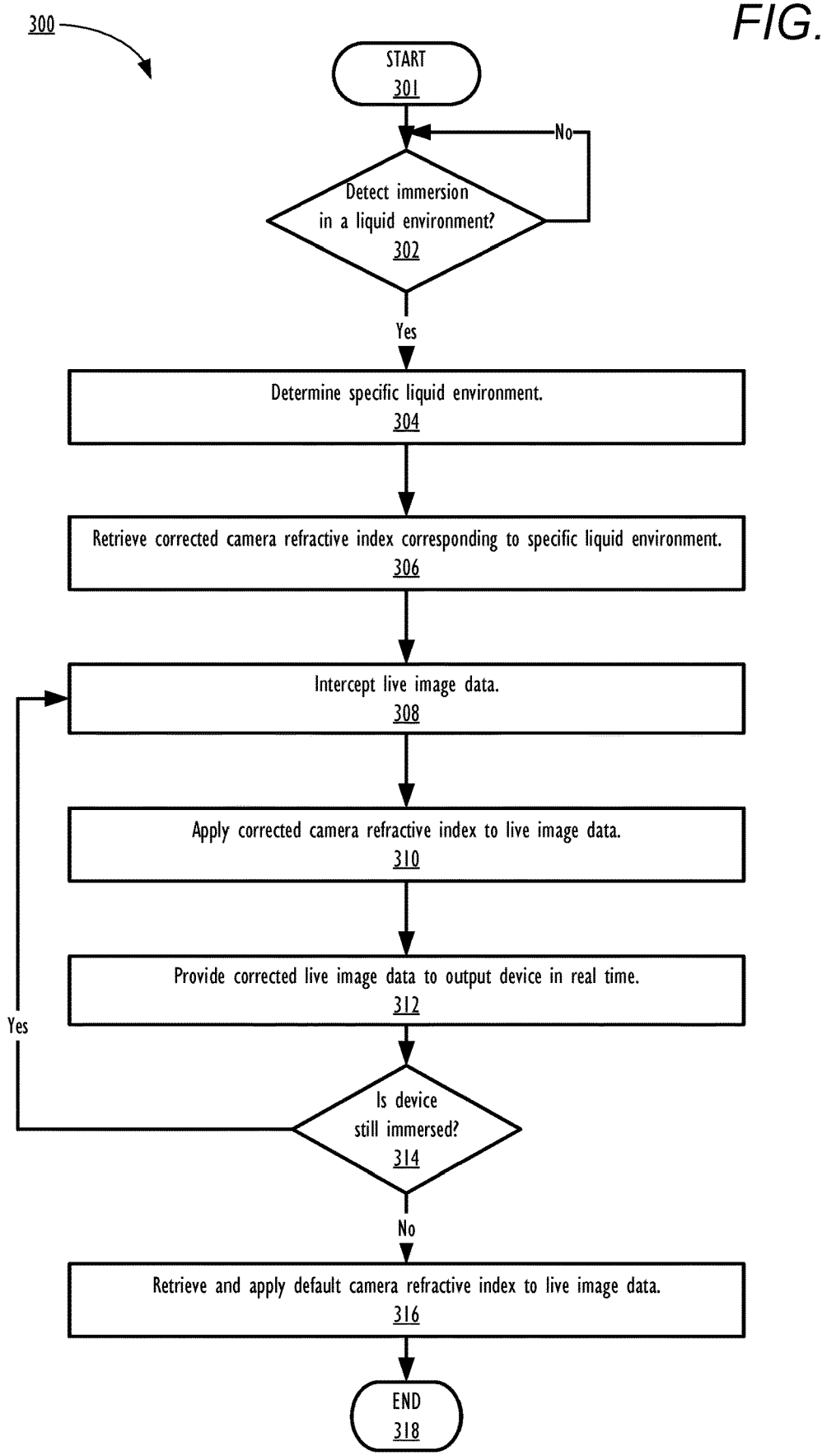
FIG. 3 is a flow chart illustrating a method for correcting for optical distortion in media captured by a camera in a liquid environment, in accordance with one or more embodiments.

Referring now to FIG. 3, there is depicted a high-level flow-chart illustrating a method for correcting for optical distortion in media captured by a camera immersed in a liquid environment, in accordance with one or more embodiments of the present disclosure. Aspects of the method are described with reference to the components of FIGS. 1-2. Several of the processes of the method provided in FIG. 3 can be implemented by a processor (e.g., CPU(s) 104) executing software code of OCU 117 within an image capturing device (e.g., image capturing device 100). The method processes described in FIG. 3 are generally described as being performed by components of image capturing device 100.

Method 300 commences at initiator block 301 then proceeds to block 302. At block 302, CPU(s) 104 determines whether image capturing device 100 is immersed in a liquid environment. The methods for determining whether image capturing device 100 is immersed in a liquid environment are described in greater detail in FIGS. 4-7, below. In response to determining that image capturing device 100 is not immersed in a liquid environment, method 300 continues to block 318 and CPU(s) 104 monitors input device(s) of image capturing device 100 to determine when image capturing device 100 is immersed in a liquid environment. In response to determining image capturing device 100 is immersed in a liquid environment, method 300 proceeds to block 304 and CPU(s) 104 determines a specific liquid environment 214a-n in which image capturing device 100 is immersed. At block 306, CPU(s) 104 retrieves corrected camera refractive index 218a-n associated with specific liquid environment 214a-n from correction database 216. At block 308, CPU(s) 104 intercepts live image data 202 captured by camera 142. At block 310, CPU(s) 104 applies corrected camera refractive index 218a-n to live image data 202 to create corrected live image data 204. At block 312, CPU(s) 104 provides corrected live image data 204 to at least one output device. At block 314, CPU(s) 104 determines whether image capturing device 100 is still immersed in the specific liquid environment. In response to determining image capturing device 100 is no longer immersed in the specific liquid environment, CPU(s) 104 retrieves default camera refractive index 244 from correction database 216, and CPU(s) 104 applies default camera refractive index 244 to the live image data 202 (block 316). Method 300 then terminates at end block 318.

The methods described in FIGS. 4-7, below, describe several different embodiments in which CPU(s) 104 determines whether image capturing device 100 is immersed in a liquid environment, without limitation. Aspects of the methods described in FIGS. 4-7 below are described with reference to the components of FIGS. 1-2. Several of the processes of the methods provided in FIGS. 4-7 can be implemented by a processor (e.g., CPU(s) 104) executing software code of OCU 117 within an image capturing device (e.g., image capturing device 100). The methods described in FIGS. 4-7 are generally described as being performed by components of image capturing device 100.

Figure 4:
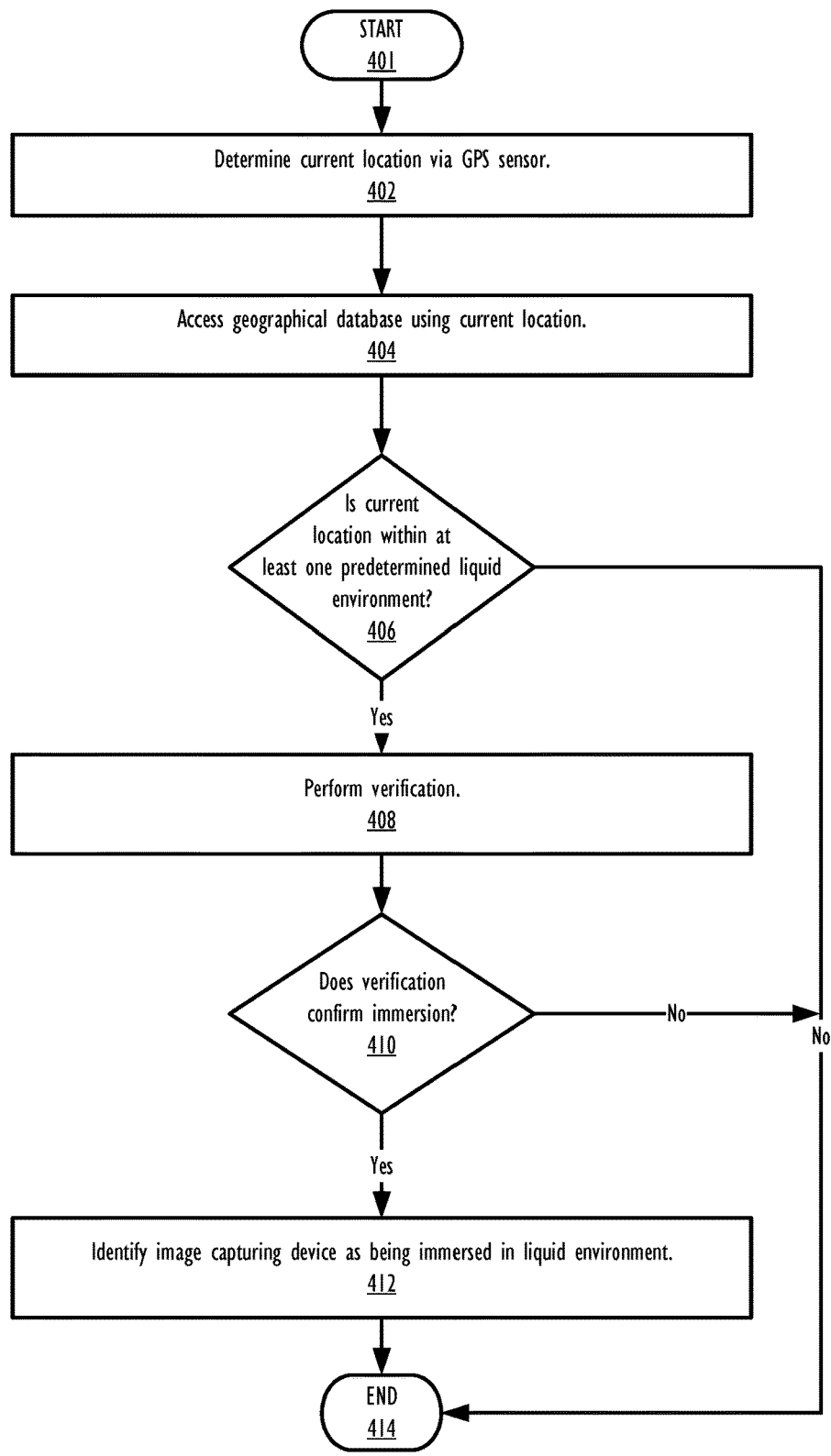
FIG. 4 is a flow chart illustrating a method for determining whether an image capture device is immersed in a liquid environment using a global positioning satellite (GPS) sensor, in accordance with one or more embodiments.

Referring now to FIG. 4, there is depicted a high-level flow-chart illustrating a method for determining whether an image capture device is immersed in a liquid environment using a global positioning satellite (GPS) sensor, in accordance with one or more embodiments of the present disclosure. Method 400 commences at initiator block 401 then proceeds to block 402. At block 402, CPU(s) 104 determines a current location (current location 210) of image capturing device 100 via GPS sensor 206. At block 404, CPU(s) 104 accesses geographical database 212 using current location 210. At block 406, CPU(s) 104 determines whether current location 210 is located within at least one liquid environment 214a-n identified in geographical database 212. In response to determining current location 210 is not located within at least one liquid environment 214a-n, method 400 terminates at block 414.

In response to determining current location 210 is located within at least one liquid environment 214a-n, CPU(s) 104 performs at least one verification to determine whether image capturing device is immersed in a liquid environment (block 408). At block 410, CPU(s) 104 determines whether the verification confirms image capturing device 100 as being immersed in a liquid environment. In response to the verification indicating that image capturing device is not immersed in a liquid environment, method 400 terminates at block 414. In response to the verification confirming that image capturing device is immersed in a liquid environment, CPU(s) 104 identifies image capturing device 100 as being immersed in a liquid environment (block 412). Method 400 then terminates at block 414.

Figure 5:
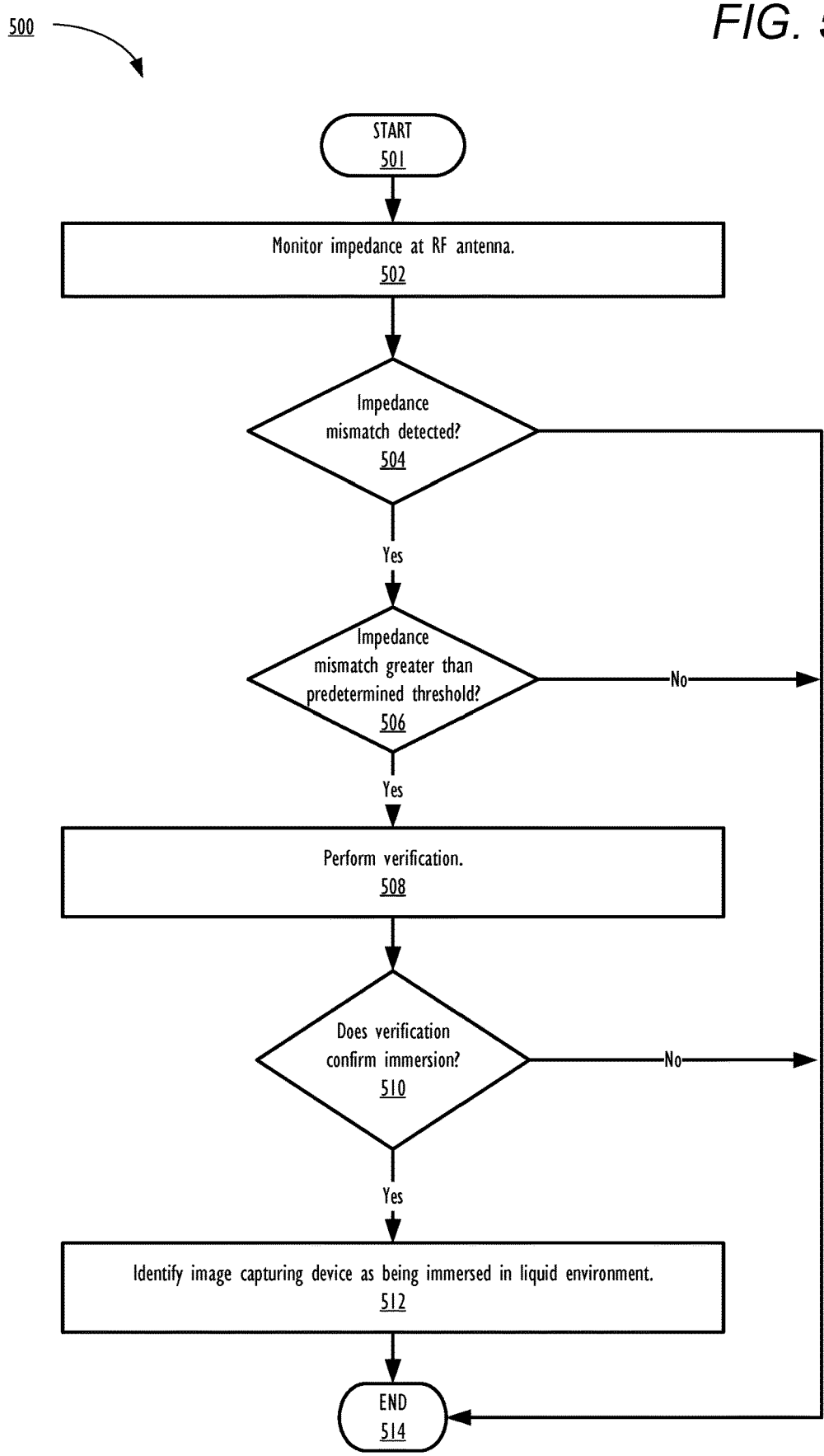
FIG. 5 is a flow chart illustrating a method for determining, based on an impedance mismatch at an antenna, whether an image capture device is immersed in a liquid environment, in accordance with one or more embodiments.

Referring now to FIG. 5, there is depicted a high-level flow-chart illustrating a method for determining, based on an impedance mismatch at an antenna, whether an image capture device is immersed in a liquid environment, in accordance with one or more embodiments of the present disclosure. Method 500 commences at initiator block 501 then proceeds to block 502. At block 502, CPU(s) 104 monitors a RF impedance at antennas 222a-n of image capturing device 100. At block 504, CPU(s) 104 determines whether an impedance mismatch is detected at antennas 222a-n. In response to determining an impedance mismatch condition is not present at antennas 222a-n, method 500 terminates at block 514. In response to detecting an impedance mismatch at antennas 222a-n, CPU(s) 104 determines whether the detected impedance mismatch is greater than predetermined impedance mismatch threshold 242 (block 506). In response to determining the impedance mismatch condition is not greater than predetermined impedance mismatch threshold 242, method 500 terminates at block 514.

In response to determining the impedance mismatch condition is greater than predetermined impedance mismatch threshold 242, CPU(s) 104 performs at least one verification to determine whether image capturing device is immersed in a liquid environment (block 508). At block 510, CPU(s) 104 determines whether the verification confirms image capturing device 100 as being immersed in a liquid environment. In response to the verification indicating that image capturing device is not immersed in a liquid environment, method 500 terminates at block 514. In response to the verification confirming that image capturing device is immersed in a liquid environment, CPU(s) 104 identifies image capturing device 100 as being immersed in a liquid environment (block 512). At block 512 CPU(s) 104 may also optionally determine, based on the value of the impedance mismatch, a particular depth of image capturing device 100 in the liquid environment, which may be used to select a particular corrected camera refractive index 218a-n. Method 500 then terminates at block 514.

Figure 6:
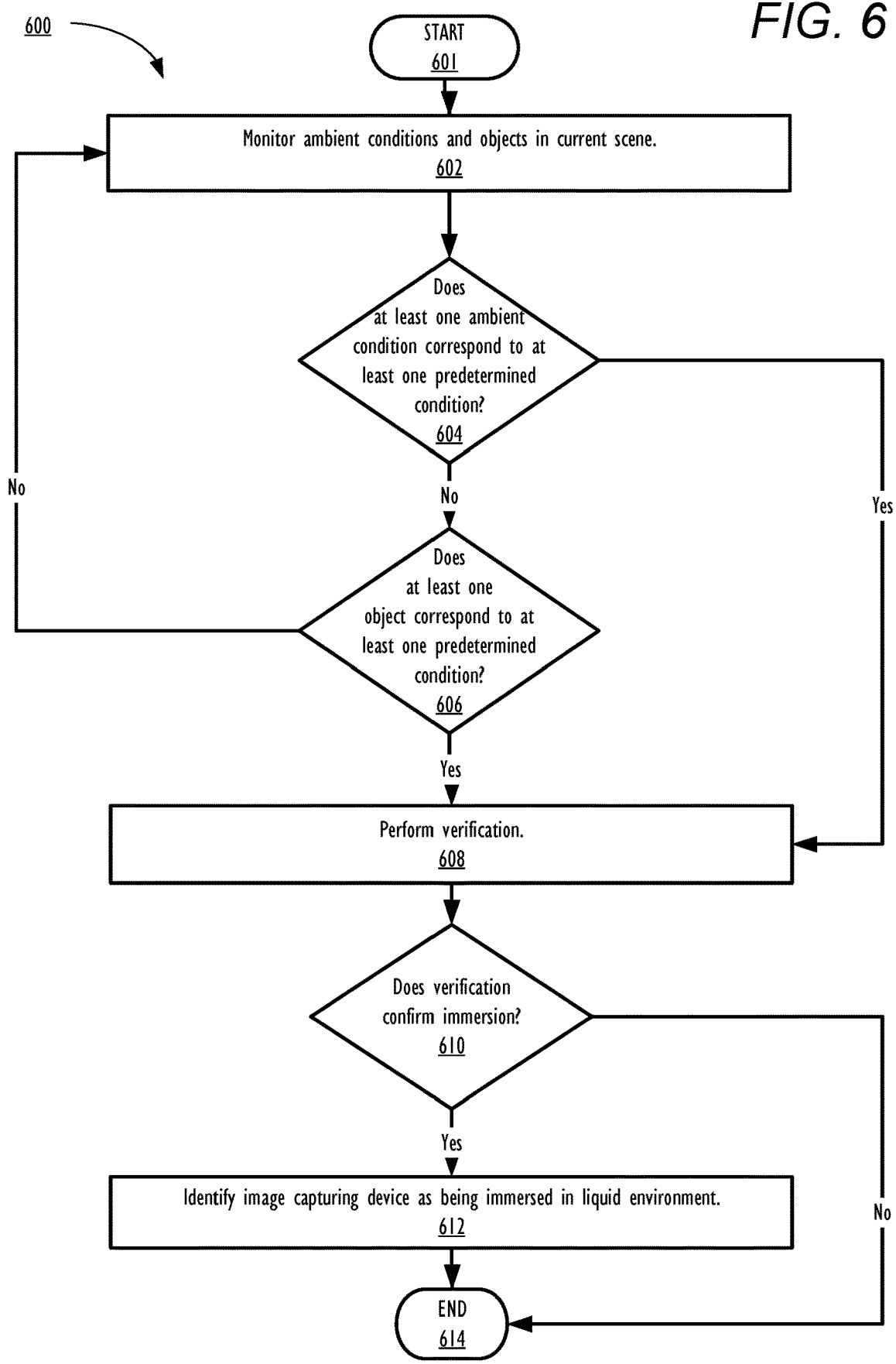
FIG. 6 is a flow chart illustrating a method for determining, based on objects and/or ambient conditions detected in a live image data captured by a camera, whether an image capture device is immersed in a liquid environment, in accordance with one or more embodiments.

Referring now to FIG. 6, there is depicted a flow chart illustrating a method for determining, based on objects and/or ambient conditions detected in a live image data captured by a camera, whether an image capture device is immersed in a liquid environment, in accordance with one or more embodiments. Method 600 commences at initiator block 601 then proceeds to block 602. At block 602, CPU(s) 104 monitors ambient conditions 234a-n and objects 238a-n in live image data 202 captured by camera 142. At block 604, CPU(s) 104 determines whether at least one of detected ambient conditions 234a-n matches at least one of pre-established ambient conditions 236a-n that are indicative of the device being immersed in a liquid environment. In response to determining at least one of detected ambient conditions 234a-n matches at least one of pre-established ambient conditions 236a-n, method 600 continues to block 608. In response to determining no ambient conditions 234a-n match pre-established ambient conditions 236a-n, method 600 continues to block 606.

At block 606, CPU(s) 104 determines whether at least one of the detected objects 238a-n matches at least one of pre-established objects 240a-n whose presence within a capture image is indicative of the device being immersed in a liquid environment. In response to determining at least one of objects 238a-n matches at least one of pre-established objects 240a-n, method 600 continues to block 608. In response to determining no objects 238a-n match pre-established objects 240a-n, method 600 returns to block 602 and CPU(s) 104 continues to monitor ambient conditions 234a-n and objects 238a-n in live image data 202.

At block 608, CPU(s) 104 performs at least one verification to determine whether image capturing device is immersed in a liquid environment. At block 610, CPU(s) 104 determines whether the verification confirms image capturing device 100 as being immersed in a liquid environment. In response to the verification indicating that image capturing device is not immersed in a liquid environment, method 600 terminates at block 614. In response to the verification confirming that image capturing device is immersed in a liquid environment, CPU(s) 104 identifies image capturing device 100 as being immersed in a liquid environment (block 612). Method 600 then terminates at block 614.

Figure 7:
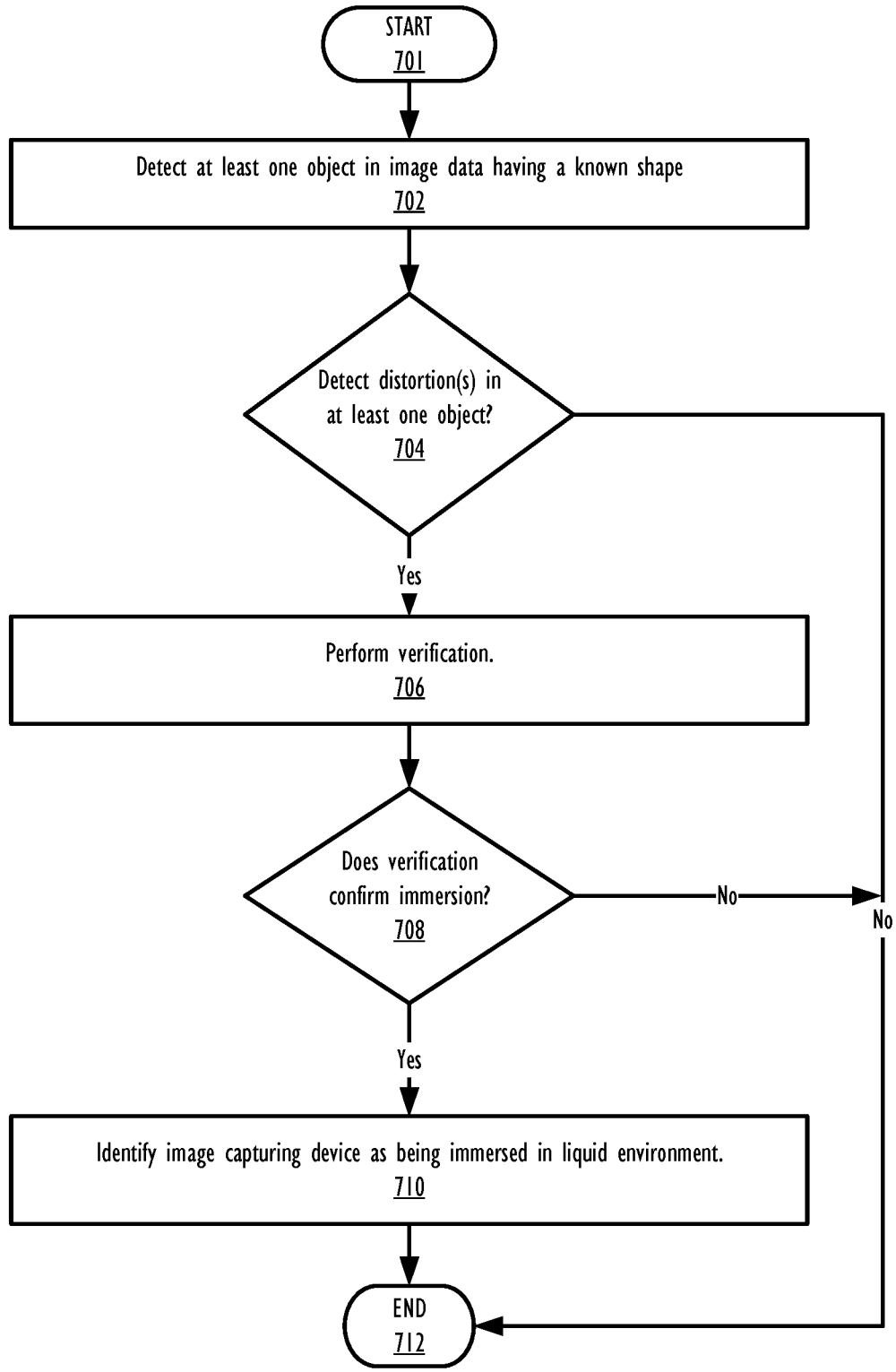
FIG. 7 is a flow chart illustrating a method for determining, based on distortions detected in a live image data captured by a camera, whether an image capture device is immersed in a liquid environment, in accordance with one or more embodiments.

Referring now to FIG. 7, there is depicted a flow chart illustrating a method for determining, based on distortions detected in a live image data captured by a camera, whether an image capture device is immersed in a liquid environment, in accordance with one or more embodiments. Method 700 commences at initiator block 701 then proceeds to block 702. At block 702, CPU(s) 104 detects at least one object (objects 238a-n) having a known shape in live image data 202 captured by camera 142 in non-liquid environment. At block 704, CPU(s) 104 determines, based on the known shape, whether the detected object(s) 238a-n are distorted in live image data 202. In response to determining object(s) 238a-n are not distorted in live image data 202, method 700 terminates at block 712. In response to determining object(s) 238a-n are distorted in live image data 202, method 700 proceeds to block 706.

At block 706, CPU(s) 104 performs at least one verification to determine whether image capturing device is immersed in a liquid environment. At block 708, CPU(s) 104 determines whether the verification confirms image capturing device 100 as being immersed in a liquid environment. In response to the verification indicating that image capturing device is not immersed in a liquid environment, method 700 terminates at block 712. In response to the verification confirming that image capturing device is immersed in a liquid environment, CPU(s) 104 identifies image capturing device 100 as being immersed in a liquid environment (block 710). Method 700 then terminates at block 712.

In the above-described flow charts, one or more of the method processes may be embodied in a computer readable device containing computer readable code such that a series of steps are performed when the computer readable code is executed on a computing device. In some implementations, certain steps of the methods are combined, performed simultaneously or in a different order, or perhaps omitted, without deviating from the scope of the disclosure. Thus, while the method steps are described and illustrated in a particular sequence, use of a specific sequence of steps is not meant to imply any limitations on the disclosure. Changes may be made with regards to the sequence of steps without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method comprising:
   detecting immersion of an image capturing device in a liquid environment; and
   in response to detecting the immersion of the image capturing device in a liquid environment:
      determining a specific liquid environment and a type of liquid in which the image capturing device is immersed;
      automatically retrieving, from among a plurality of corrected camera refractive indexes stored in a correction database, a corrected camera refractive index corresponding to the specific liquid environment and a composition of the liquid within that specific liquid environment;
      intercepting, for correction of optical distortion caused by immersion in the liquid environment, captured live image data of a current scene that is captured by at least one camera sensor of the image capturing device, wherein the captured live image data includes at least one of a video stream and at least one still frame;
      applying the corrected camera refractive index to the intercepted, captured live image data to create corrected live image data, which corrects for the optical distortion in the captured live image data caused by the specific liquid environment, the intercepting and applying provided before the captured live image data of the image capturing device is outputted to an output device; and
      providing, in real time of capturing the live image data, the corrected live image data to the output device.

2. The method of claim 1, further comprising:
   in response to detecting that the image capturing device is no longer immersed in the specific liquid environment, retrieving, from correction database, a default camera refractive index configured for capturing live image data in a non-liquid environment; and applying the default camera refractive index to live image data captures while the image capturing device is in the non-liquid environment.

3. The method of claim 1, wherein detecting immersion of the image capturing device further comprises:
   identifying, in the live image data, at least one object having a known shape;
   monitoring the at least one object for distortions that effect an appearance of the known shape in the live image data;
   in response to identifying at least one distortion in the live image data, performing at least one verification to validate the image capturing device as being immersed in the liquid environment; and
   in response to the at least one verification indicating that the image capturing device is immersed in the liquid environment, identifying the image capturing device as being immersed in a liquid environment.

4. The method of claim 1, wherein detecting immersion of the image capturing device further comprises:
   determining, via at least one of a global positioning satellite sensor and a wireless transceiver triangulating a wireless network signal to a wireless carrier, a current location of the image capturing device;
   accessing a geographical database to determine whether the current location is within at least one predetermined region that is identified within the geographical database as corresponding to a liquid environment, each liquid environment corresponding to respective geographic regions and the determining of the specific liquid environment includes determining the specific liquid environment associated in the geographical database with a current or most recent location of the image capture device;
   in response to determining the current location is within the at least one predetermined region, performing at least one verification to validate the image capturing device as being immersed in the liquid environment; and
   in response to the at least one verification indicating that the image capturing device is immersed in the liquid environment, identifying the image capturing device as being immersed in the liquid environment.

5. The method of claim 1, wherein detecting immersion of the image capturing device further comprises:
   detecting a radio frequency (RF) impedance mismatch of at least one RF antenna of the image capturing device;
   determining whether a level of the RF impedance mismatch exceeds a predetermined threshold;
   in response to determining the level of the RF impedance mismatch exceeds the predetermined threshold, performing at least one verification to validate the image capturing device as being immersed in the liquid environment; and
   in response to the at least one verification indicating that the image capturing device is immersed in the liquid environment, identifying the image capturing device as being immersed in a liquid environment.

6. The method of claim 1, wherein detecting immersion of the image capturing device further comprises:
   identifying, within the live image data, ambient conditions in the current scene;
   determining whether the ambient conditions correspond to at least one pre-established ambient condition that is associated with a liquid environment, the ambient conditions identifying one or more of specific ambient colors, ambient light color ranges, and light source conditions in the current scene;
   in response to determining the ambient conditions correspond to at least one pre-established ambient condition, performing at least one verification to validate the image capturing device as being immersed in the liquid environment; and
   in response to the at least one verification indicating that the image capturing device is immersed in the liquid environment, identifying the image capturing device as being immersed in a liquid environment.

7. The method of claim 1, wherein detecting immersion of the image capturing device further comprises:
   identifying, within the live image data, at least one object in the current scene;
   determining whether the at least one object corresponds to at least one pre-established underwater object from among a plurality of pre-established underwater objects associated with a liquid environment;
   in response to determining the at least one object corresponds to at least one pre-established underwater object, performing at least one verification to validate the image capturing device as being immersed in the liquid environment; and in response to the at least one verification indicating that the image capturing device is immersed in the liquid environment, identifying the image capturing device as being immersed in a liquid environment.

8. The method of claim 1, wherein detecting immersion of the image capturing device further comprises:

receiving, from at least one input device of the image capturing device, at least one input that indicates the image capturing device is immersed in a liquid environment.

9. An image capturing device comprising:

a memory;

at least one camera sensor that captures live image data of a current scene, wherein the live image data includes at least one of a video stream and at least one still frame;

at least one input device that receives an input indicating the image capturing device is immersed in a liquid environment;

at least one processor that is communicatively coupled to the least one camera sensor and the at least one input device, and which:

determines a specific liquid environment and a type of liquid in which the image capturing device is immersed;

automatically retrieves, from among a plurality of corrected camera refractive indexes stored in a correction database, a corrected camera refractive index corresponding to the specific liquid environment and a composition of the liquid within that specific liquid environment;

intercepts, for correction of optical distortion caused by immersion in the liquid environment, the captured live image data; and applies a corrected camera refractive index to the intercepted, captured live image data to create corrected live image data, which corrects for the optical distortion in the captured live image data caused by the specific liquid environment, the intercepting and applying provided before the captured live image data of the image capturing device is outputted to an output device; and at least one output device that is communicatively coupled to the at least one processor and which presents the corrected live image data in real time of capturing the live image data.

10. The image capturing device of claim 9, wherein:

the at least one input device detects the image capturing device as no longer being immersed in the specific liquid environment; and the at least one processor, in response to determining the image capturing device is no longer immersed in the specific liquid environment: retrieving, from correction database, a default camera refractive index configured for capturing live image data in a non-liquid environment; and applying the default camera refractive index to live image data captured while the image capturing device is in the non-liquid environment.

11. The image capturing device of claim 9, wherein the at least one input device further comprises at least one image processing module that:

identifies, in the live image data, at least one object having a known shape;

monitors the at least one object for distortions that effect an appearance of the known shape in the live image data;

in response to identifying at least one distortion in the live image data, performs at least one verification to validate the image capturing device as being immersed in a liquid environment; and in response to the at least one verification indicating that the image capturing device is immersed in the liquid environment, identifies the image capturing device as being immersed in a liquid environment.

12. The image capturing device of claim 9, wherein:

the at least one input device further comprises at least one of a global positioning satellite (GPS) sensor and at least one wireless transceiver;

in receiving the input indicating the image capturing device is immersed in a liquid environment, the at least one input device detects a current location of the image capturing device via at least one of the GPS sensor and the at least one wireless transceiver, which triangulates a wireless network signal to a wireless carrier to determine the current location of the image capturing device; and the at least one processor:

accesses a geographical database to determine whether the current location is within at least one predetermined region that is identified within the geographical database as corresponding to a liquid environment; and in response to determining the current location is within the at least one predetermined region, performs at least one verification to validate the image capturing device as being immersed in the liquid environment; and in response to the at least one verification indicating that the image capturing device is immersed in the liquid environment, identifies the image capturing device as being immersed in a liquid environment.

13. The image capturing device of claim 9, wherein:

the at least one input device further includes at least one radio frequency (RF) antenna and at least one RF transceiver;

in receiving the input indicating the image capturing device is immersed in a liquid environment, the at least one RF transceiver detects a RF impedance mismatch at the at least one RF antenna; and the at least one processor:

determines whether a level of the RF impedance mismatch exceeds a predetermined threshold;

in response to determining the level of the RF impedance mismatch exceeds the predetermined threshold, performs at least one verification to validate the image capturing device as being immersed in the liquid environment; and in response to the at least one verification indicating that the image capturing device is immersed in the liquid environment, identifies the image capturing device as being immersed in a liquid environment.

14. The image capturing device of claim 9, wherein the at least one input device further comprises at least one image processing module that:

monitors, within the live image data, ambient conditions in the current scene;

compares the ambient conditions to determine whether the ambient conditions correspond to at least one pre-established ambient condition that is associated with a liquid environment, the ambient conditions identifying one or more of specific ambient colors, ambient light color ranges, and light source conditions in the current scene;

in response to determining the ambient conditions correspond to at least one pre-established ambient condition, performs at least one verification to validate the image capturing device as being immersed in the liquid environment; and in response to the at least one verification indicating that the image capturing device is immersed in the liquid environment, identifies the image capturing device as being immersed in a liquid environment.

15. The image capturing device of claim 9, wherein the at least one input device further comprises at least one image processing module that:

identifies, within the live image data, at least one object in the current scene;

compares the at least one object to a plurality of pre-established underwater objects associated with a liquid environment to determine whether the at least one object is an underwater object associated with a liquid environment;

in response to determining the at least one object corresponds to at least one pre-established underwater object, performs at least one verification to validate the image capturing device as being immersed in the liquid environment; and in response to the at least one verification indicating that the image capturing device is immersed in the liquid environment, identifies the image capturing device as being immersed in a liquid environment.

16. The image capturing device of claim 9, wherein the input indicates the image capturing device is immersed in a liquid environment and is received via at least one of a user input device and an immersion sensor.

17. A computer program product comprising:

a non-transitory computer readable storage device; and program code on the computer readable storage device that when executed by a processor associated with at least one camera sensor of an image capturing device, the program code enables the image capturing device to provide the functionality of:

detecting immersion of an image capturing device in a liquid environment; and in response to detecting the immersion of the image capturing device:

determining a specific liquid environment and a type of liquid in which the image capturing device is immersed;

automatically retrieving, from among a plurality of corrected camera refractive indexes stored in a correction database, a corrected camera refractive index corresponding to the specific liquid environment and a specific composition of the liquid within that specific liquid environment;

intercepting, for correction of optical distortion caused by immersion in the liquid environment, captured live image data of a current scene that is captured by at least one camera sensor of the image capturing device, wherein the captured live image data includes at least one of a video stream and at least one still frame;

providing, in real time, corrected live image data to an output device;

applying the corrected camera refractive index to the intercepted, captured live image data to create corrected live image data, which corrects for the optical distortion in the captured live image data caused by the specific liquid environment in the captured live image data the intercepting and applying provided before the captured live image data of the image capturing device is outputted to an output device; and providing, in real time of capturing the live image data, the corrected live image data to the output device.

18. The computer program product of claim 17, the program code for detecting immersion of the image capturing device further comprises code for:

determining, via at least one of a global positioning satellite sensor and a wireless transceiver triangulating a wireless network signal to a wireless carrier, a current location of the image capturing device;

accessing a geographical database to determine whether the current location is within at least one predetermined region that is identified within the geographical database as corresponding to a liquid environment;

in response to determining the current location is within the at least one predetermined region, performing at least one verification to validate the image capturing device as being immersed in the liquid environment; and in response to the at least one verification indicating that the image capturing device is immersed in the liquid environment, identifying the image capturing device as being immersed in a liquid environment.

19. The computer program product of claim 17, the program code for detecting immersion of the image capturing device further comprises code for:

identifying, in the live image data, at least one object having a known shape;

monitoring the at least one object for distortions that effect an appearance of the known shape in the live image data;

in response to identifying at least one distortion in the live image data, performing at least one verification to validate the image capturing device as being immersed in the liquid environment; and in response to the at least one verification indicating that the image capturing device is immersed in the liquid environment, identifying the image capturing device as being immersed in a liquid environment.

20. The computer program product of claim 17, the program code for detecting immersion of the image capturing device further comprises code for:

identifying, within the live image data, ambient conditions in the current scene;

determining whether the ambient conditions correspond to at least one pre-established ambient condition that is associated with a liquid environment, the ambient conditions identifying one or more of specific ambient colors, ambient light color ranges, and light source conditions in the current scene;

in response to determining the ambient conditions correspond to at least one pre-established ambient condition, performing at least one verification to validate the image capturing device as being immersed in the liquid environment; and in response to the at least one verification indicating that the image capturing device is immersed in the liquid environment, identifying the image capturing device as being immersed in a liquid environment.

* * * * *